United States Patent [19]

Ahlberg et al.

[11] 3,971,447

[45] July 27, 1976

[54] DRILL ROD FOR PERCUSSION DRILLING

[75] Inventors: Erik Ahlberg, Nacka; Ingvar Carlvik, Lidingo; Bernt Soren Liljekvist; Anders Carl Gustaf Hagglund, both of Sandviken, all of Sweden

[73] Assignees: Sandvik Aktiebolag, Sandviken; Atlas Copco Aktiebolag, Nacka, both of Sweden

[22] Filed: Dec. 3, 1974

[21] Appl. No.: 529,053

[30] Foreign Application Priority Data

Dec. 3, 1973 Sweden ............................ 73162760

[52] U.S. Cl. ................................ 173/128; 175/320; 181/33 A

[51] Int. Cl.$^2$ ........................ E21C 15/00; F16F 7/00

[58] Field of Search ............... 173/128, DIG. 2, 139; 175/320; 181/33 A

[56] References Cited

UNITED STATES PATENTS

| | | | |
|---|---|---|---|
| 3,265,091 | 8/1966 | DeJarnett | 175/320 |
| 3,842,942 | 10/1974 | Jensen et al. | 181/33 A |

FOREIGN PATENTS OR APPLICATIONS

| | | | |
|---|---|---|---|
| 1,151,477 | 7/1963 | Germany | 175/320 |
| 536,786 | 5/1941 | United Kingdom | 175/320 |
| 552,305 | 3/1943 | United Kingdom | 175/320 |

*Primary Examiner*—James A. Leppink

*Attorney, Agent, or Firm*—Pierce, Scheffler & Parker

[57] ABSTRACT

Drill rod for percussion drilling comprising a central rod member and a sleeve member disposed therearound for a major portion of its length. An annular space is provided between said rod and sleeve members, said space being partially filled with one or several elements of noise-suppressing material, said elements when in plural being spaced from each other.

12 Claims, 7 Drawing Figures

DRILL ROD FOR PERCUSSION DRILLING

The invention relates to a drill rod for percussion drilling, and is more particularly concerned with a percussion drill rod comprising an inner rod member having a sleeve member disposed therearound for a major portion of its length capable of reducing the noise produced during the drilling operation.

It is common experience to provide a drill rod with a coating of rubber or the like so as to prevent the rod from being damaged and simultaneously achieve mechanical damping of the shocks transmitted thereto. Such drill rod embodiments, however, are disadvantageous because of the decreased drilling effect inherent therewith, and this is so because such rods absorb too much impact energy and hence fail to provide sufficient vibration dampening. It is, therefore, the primary object of the invention to provide a drill rod for percussion drilling particularly effective in noise suppressing while absorbing a minimum of impact energy.

To this end there is provided a drill rod including an inner rod member and an outer sleeve member such that an annular space is provided between said rod and sleeve members, said space being partially filled with elements of noise-suppressing material arranged with intermediate space from each other. By providing these elements so that said annular space in uncompletely occupied thereby a minimum of impact energy will be absorbed whilst noise will be suppressed.

The invention will now be described in greater detail in the following description and by way of illustrative examples, taken with reference to the accompanying drawings, in which FIG. 1 is a longitudinal sectional view of a drill rod of the invention;

Figure 1:
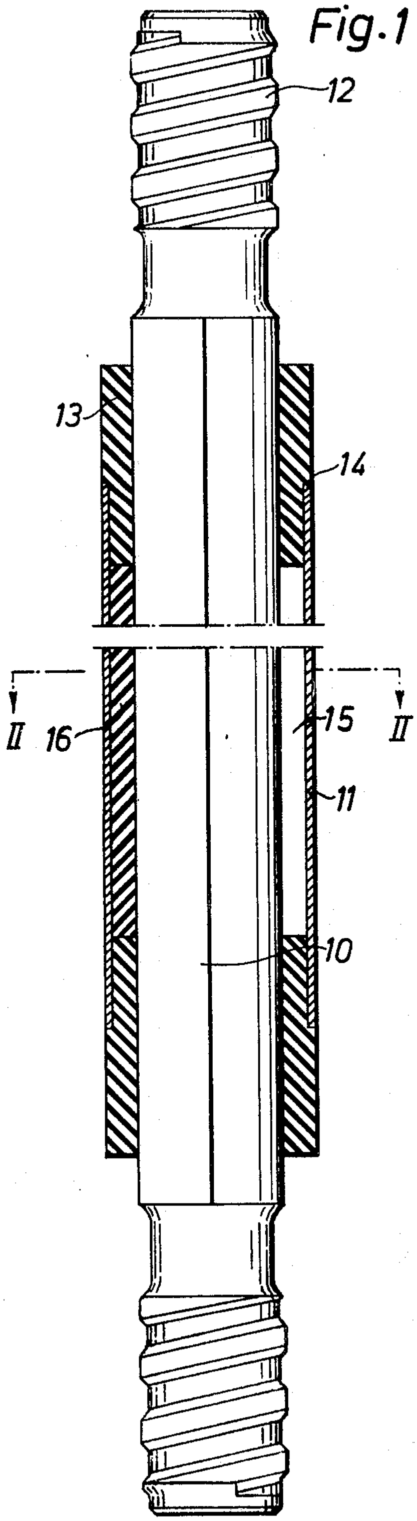

The drill rod consists of a central rod 10 and a sleeve 11 disposed concentrically therearound. In the embodiments shown, the rod 10 is an extrusion drill rod with threaded ends 12. The rod 10 is surrounded by the sleeve 11 for a major portion of its length. The sleeve 11 consists of a material of high strength which also is resistant to abrasion. A passageway is also provided along the longitudinal center line of the rod to allow flushing medium to be transmitted to the front end thereof.

At its opposite ends the sleeve 11 is connected with the rod 10 by means of annular locking elements 13. Desirably, each locking element consists of elastic material and is secured to the rod 10 by any suitably mechanical means, such as clamping means, or by vulcanization. The sleeve is supported between opposed abutments 14 provided radially on said locking elements 13 such that an annular space 15 is left between the rod and the sleeve. This drill rod assembly is exteriorly completely smooth so as to facilitate wash of drillings out from the drilled hole.

In order to have the sleeve isolated from the rod one or several elements of vibration-damping material, such, for example, as rubber, are provided in the annular space 15 therebetween. It is of primary importance in connection herewith that said damping elements only partially occupy the annular space 15 while being spaced from each other so that lateral bending of the rod 10 is possible within the sleeve 11. Preferably, said damping elements have the same thickness as the annular space 15 so that the rod 10 is safely guided centrally in the sleeve 11.

Figure 2:
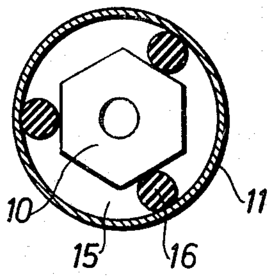
FIG. 2 is a cross-sectional view taken along the line II—II in FIG. 1.

In the embodiment shown in FIGS. 1–2 the damping elements are formed as longitudinally extending ribs 16 each of which has a circular cross-section. It is to be understood, however, that also other than circular cross-sections thereof apply, — square for instance. Before entering such ribs into the annular space 15 each of them may have been twisted around its own axis.

Figure 3:
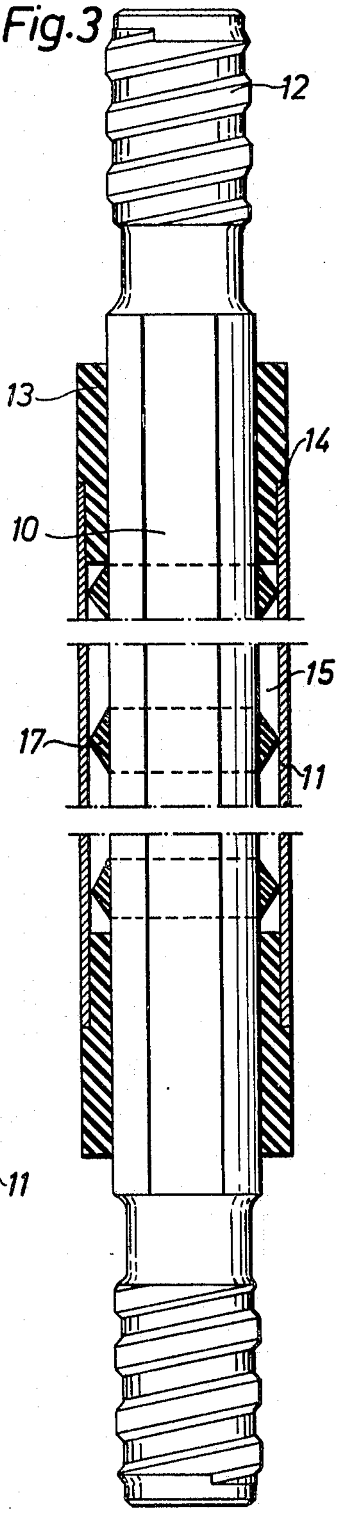
FIG. 3 is a longitudinal sectional view of another embodiment of the invention.

In an alternative embodiment, shown in FIG. 3, the damping elements are formed as annular rings 17, preferably of triangular cross-section, provided on the rod 10. A plurality of such rings 17 may be provided axially of the rod.

Figure 4:
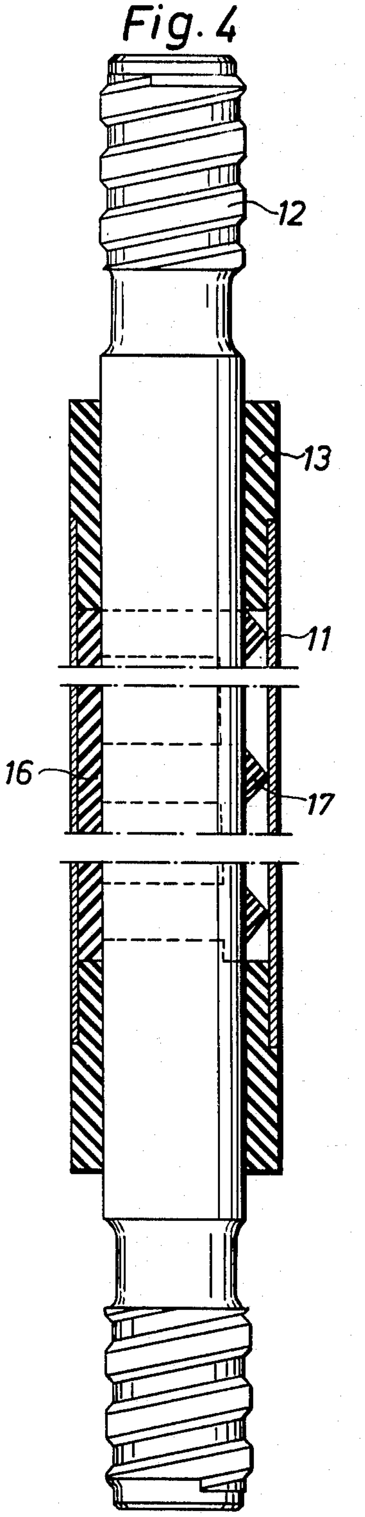
FIG. 4 is a longitudinal sectional view of another embodiment of the invention.

As an alternative to the embodiments described with reference to FIGS. 1–3 an elastomeric network structure may be applied on said drill rod 10 for radially spacing said sleeve from said drill rod. An example of such network structure is indicated by dashed lines in FIG. 4. Annularly extending portions 17 thus interconnect consecutive longitudinal ribs 16 so as to provide an elastomeric network structure. Suitably, said network structure is integral with one of the locking elements 13 mounted on said drill rod 10 for radially spacing the sleeve from the rod. Alternatively, said network structure can be integral with both of said opposed locking elements 13.

Figure 5:
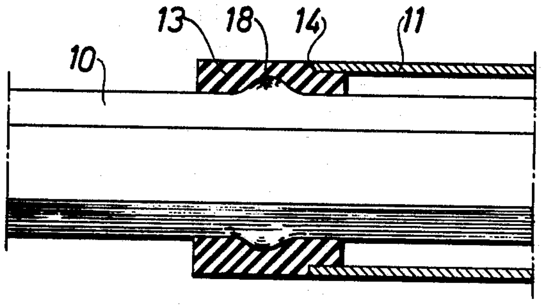
FIG. 5 is a possible embodiment of drill rod and means provided for connecting the sleeve member with the inner rod member.
Figure 6:
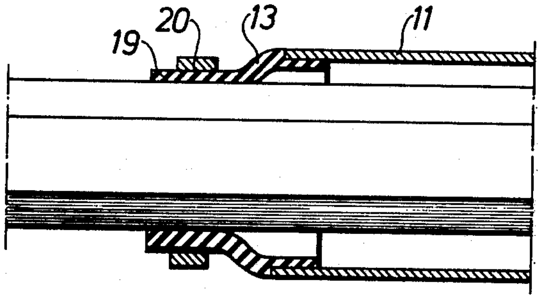
FIG. 6 is another embodiment of drill rod and means for connecting said rod and sleeve members to each other.
Figure 7:
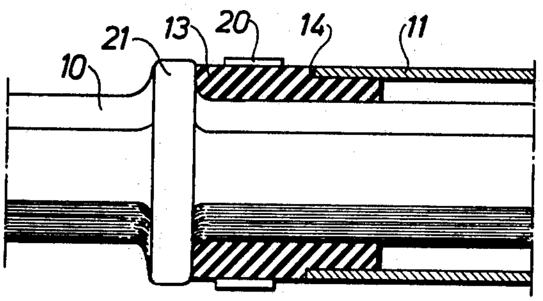
FIG. 7 is still another embodiment of drill rod and means for connecting said rod and sleeve members to each other.

The elements 13 adapted to support the sleeve around the rod in an axially fixed position may be secured to the rod by various means. In FIG. 5 there is shown one possible embodiment according to which the rod 10 is provided with a radially extending protrusion 18 that is integral with the rod and formed by upsetting. The element 13 is provided thereon and secured to the rod by any suitable mechanical means wherewith the element 13 is interiorly shaped in correspondence with said protrusion. Alternatively, the rod 10 may be provided with pairs of protrusions 18 between which the elements 13 are fastened. In FIG. 6 there is shown another embodiment wherein the element 13 has a constricted end portion 19 complementary to the shape of the rod member upon which an annular locking or clamping element 20 is applied. Such a mode of locking means may, to advantage, be combined with the design of radial protrusions 18 on the rod related above. Yet another embodiment is shown in FIG. 7 wherein the element 13 axially abuts against a collar 21 that is radially extending and integral with the rod 10.

A drill rod of the above related design has proved to have a surprisingly high noise-damping capability in comparison with drill rods of conventional construction. This effect has been achieved by entirely isolating the rod section from the sleeve member enclosing same, thus effectively absorbing noise transmitted through the rod. At the same time lateral bending of the rod within the sleeve is made possible without a considerable loss of drilling efficiency due to energy absorbation of the drill rod.

The invention is not restricted to the described and illustrated embodiments but can as well be applied to any drill rod suitable for percussion drilling. For example, the drill rod may be an integral chisel type drill rod, the sleeve member then being provided forwardly of the collar that is radially extending at the rear portion thereof.

We claim:

1. An improved silenced drill rod for percussive drilling of the type wherein a noise-suppressing sleeve is disposed around said drill rod and extends along a major portion thereof, wherein the improvement comprises first elastomeric means (13) mounted on said drill rod (10) for substantially isolating said sleeve from said drill rod and for radially spacing said sleeve from said drill rod whereby to provide an annular space (15) therebetween, and second elastomeric means (17) in said space axially spaced from said first elastomeric means and radially substantially filling said space for damping out vibration of said drill rod, said second elastomeric means only partially filling said space whereby to permit lateral bending of said drill rod within said sleeve during transmission of impact energy through said drill rod.

2. A drill rod as defined in claim 1, in which said second elastomeric means comprise an annular ring (17).

3. Drill rod as defined in claim 2, wherein the vibration-damping elements are in the form of annular rings of triangular cross-section provided with intermediate space axially of the drill rod.

4. A drill rod as defined in claim 1, in which said second elastomeric means comprise at least two annular rings (17) in axially spaced relationship.

5. Drill rod as defined in claim 1, in which said first elastomeric means (13) comprises two locking elements disposed at opposite ends of said drill rod so as to secure the sleeve to the rod, both said locking elements having radial abutments (14) between which the sleeve is supported.

6. Drill rod as defined in claim 5, in which the rod member is provided with radial protrusions (18) on which the locking elements (13) are provided.

7. Drill rod as defined in claim 5, in which the rod is provided with radial protrusions (18) arranged in pairs, the locking elements (13) being located therebetween.

8. Drill rod as defined in claim 5, in which each locking element is provided with a constricted portion (19) complementary to the shape of the rod member over which clamping means (20) are provided.

9. An improved silenced drill rod for percussion drilling of the type wherein a noise suppressing sleeve is disposed around said drill rod and extends along a major portion thereof, wherein the improvement comprises first elastomeric means (13) mounted on said drill rod (10) for substantially isolating said sleeve from said drill rod and for radially spacing said sleeve from said drill rod whereby to provide an annular space (15) therebetween, and second elastomeric means (16) in said space extending longitudinally between said first elastomeric means and radially substantially filling said space in a fraction of its peripheral extent for damping out vibration of said drill rod, said second elastomeric means comprising several ribs (16) diposed with a mutual spacing around said drill rod, said second elastomeric means permitting lateral bending of said drill rod within said sleeve during transmission of impact energy through said drill rod.

10. A drill rod as defined in claim 9, in which there are third elastomeric means (17) in said space axially spaced from said first elastomeric means (13) and interconnecting two consecutive longitudinal ribs (16) whereby to provide an elastomeric network structure.

11. A drill rod as defined in claim 10, in which said first elastomeric means (13) comprise two members disposed at opposite ends of said drill rod, one of which is integral with said network structure.

12. A drill rod as defined in claim 10, in which said first (13), second (16), and third (17) elastomeric means are integral.

* * * * *